United States Patent [19]

Dehan et al.

[11] 4,286,473
[45] Sep. 1, 1981

[54] DEVICE FOR THE CONTROL BY CAM OF A MOBILE MECHANISM

[75] Inventors: Gerard C. H. Dehan, Montgeron; Jean-Pierre Maulat, Saint Maur, both of France

[73] Assignee: Societe Nationale d'Etude et de Construction de Moteurs d'Aviation, Paris, France

[21] Appl. No.: 17,574

[22] Filed: Mar. 5, 1979

[30] Foreign Application Priority Data

Mar. 3, 1978 [FR] France .............................. 78 06120

[51] Int. Cl.³ ............................................ F16H 53/00
[52] U.S. Cl. ............................................ 74/107; 74/567
[58] Field of Search ............. 74/107, 411, 470, 480 R, 74/567

[56] References Cited

U.S. PATENT DOCUMENTS

| 2,517,142 | 8/1950 | Staley | 74/470 X |
| 2,656,178 | 10/1953 | Hughes | 74/470 X |
| 2,891,784 | 6/1959 | Taylor | 74/567 X |
| 3,034,363 | 5/1962 | Vogel | 74/567 X |
| 3,213,548 | 10/1965 | Deaton | 75/411 X |
| 3,438,271 | 4/1969 | Cain | 74/107 X |

FOREIGN PATENT DOCUMENTS 1089203 9/1954 France ...................................... 74/470

Primary Examiner—Lawrence J. Staab
Attorney, Agent, or Firm—Bacon & Thomas

[57] ABSTRACT

The position of a mechanism is regulated by means of a cam moved by a motor to actuate a contact connected with the mechanism. The device includes an arrangement to reset the cam to a predetermined position in case of a failure of the motor. A mobile cam stop is provided and the arrangement to reset the cam in the direction of the mobile cam stop also includes mechanism to reset the mobile stop in the direction of the cam and arrest the stop.

10 Claims, 4 Drawing Figures

DEVICE FOR THE CONTROL BY CAM OF A MOBILE MECHANISM

BACKGROUND OF THE INVENTION

The invention concerns a device for the control of the position of a mobile mechanism by means of a cam driven by a motor to actuate a contact connected with said mechanism. The device according to the invention makes it possible, in case of a failure which does not affect the freedom of movement of the cam, to reset said cam toward a predetermined, accurate and stable position. Such cases of failure are for example a rupture of the connecting mechanism between the motor and the cam, or, when the motor is an electric motor, an electrical failure, or again, if the motor is a hydraulic jack, a leak of the jack or its supply circuit.

The invention applies in particular to regulators controlled by means of a cam to guide the operation of a mechanism, a machine or a motor. The device of the invention is specifically suitable for the control of the operation of the regulator of a metering device for metering flow of fuel in a combustion chamber of a jet engine, because it makes it possible, in case of a failure of the motive device of the cam of the regulator, to maintain operational conditions with respect to the chamber, at an operating level designated "emergency", thus alleviating all catastrophic consequences.

SUMMARY OF THE INVENTION

The control device according to the invention comprises a cam, a motor causing the displacement of said cam, a contact connected with the mechanism to be controlled and means to apply the contact against the operating profile of the cam; a feature is that it comprises in addition a mobile stop mechanism, means to move the cam toward the stop mechanism, means to move the stop mechanisms toward the cam and means to arrest the stop mechanism in its movement toward the cam in order to determine a stopping position; said setting means of the cam and setting means of the stop are designed so that the resistance offered by the means for setting the stop mechanism and by friction to the thrust of the cam upon the stop mechanism is appreciably lower than the resultant of the forces exerted on the cam by the motor, the means for setting the cam and the contact, while the resistance offered by the means for setting the cam, the contact and the friction to the thrust of the stop mechanism upon the cam is appreciably less than the force exerted by the means for setting the stop mechanism on it; the result being that the cam is capable, when actuated by its motor, of repulsing the stop mechanism to move it from its position of stoppage, while the stop mechanism is capable, when the cam is not actuated by its motor, of repulsing the cam until the stop position is attained.

The following may be noted at this point:

that, if the profile of the cam is such that the action of the contact on the cam tends to push said cam toward the position of the stop, the means for setting the cam may consist merely of the means of support of the contact on the profile of the cam;

that the motive motor of the cam may consist for example of an electric motor or a hydraulic jack; the device according to the invention makes it possible to alleviate the consequences of a power failure in the first case or of a leak in the second case;

that the abovementioned definition does not prejudge the nature of the means for setting the cam and the stop mechanism; said means may consist for example of springs or hydraulic jacks; the essential requirement is that the conditions established hereinabove with respect to the relative value of forces and resistances must be observed.

Devices employing opposing springs intended to return a cam to a predetermined position in the case of the failure of the motor of the cam, are already in existence. But, the fact that the resetting forces employed in these devices are continuous functions of the position of the cam, requires, in order to have a nearly constant reset position, the use of very stiff springs and thus of a cam motor capable of overcoming, at the ends of the run of the cam, the tensile or compressive forces exerted by the springs. Also, the position of resetting, which is an equilibrium position, is never absolutely stable because of friction; this may result in inconvenient or even dangerous phenomena, such as surging, if the device controlled by the cam is a regulator.

In contrast, in the device of the invention, the reset position is determined by the discontinuance of the forces applied to the cam, said discontinuance occurring when the cam and the stop mechanism come into mutual contact. The result is not only an absolute stability of the reset position, but also a great facility of regulating said position, in fact, a simple mechanism to control the stopping position of the stopping mechanism suffices.

BRIEF DESCRIPTION OF THE DRAWINGS

For the better understanding of the operation of the device according to the invention and to demonstrate other advantageous embodiments thereof, several non-limiting examples of the invention will be described hereafter. The description shall make reference to the drawings attached hereto, wherein.

DESCRIPTION OF THE PREFERRED EMBODIMENTS

Figure 1:
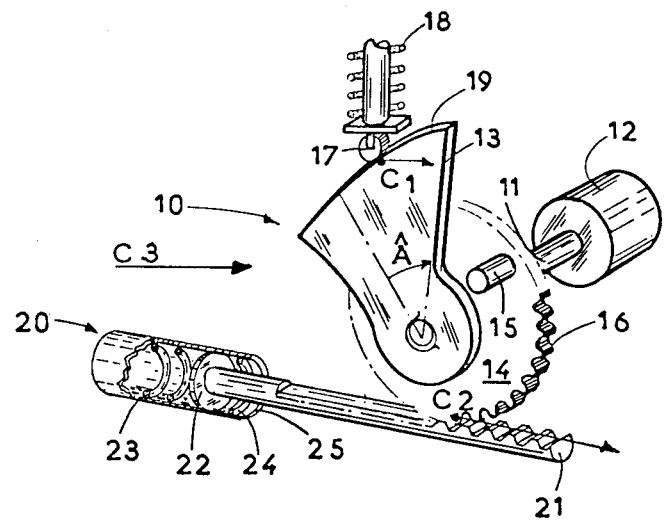
FIG. 1 is a schematic view in perspective of a first device embodying the invention and with a rotating cam.

FIG. 1 shall be considered first. The cam 10 is driven during normal operation by the shaft 11 of the motor 12. The stop mechanism consists of a disk 14 mounted in a freely pivoting manner on the shaft 11 and carrying a finger 15; the flank 13 of the cam 10 abuts against said finger when the cam arrives in the stopping position. The mechanism to be controlled by the cam is not shown. Control is effected by means of a follower 17 held against the operating profile 19 of the cam 10 by means of a compression spring 18. The stop resetting mechanism consists of a rack 21 which is integral with a piston 22 of a jack-screw with a spring 23.

The rack 21 engages teeth 16 on a fraction of the periphery of the disk 14. At the end of its course, the piston 22 is arrested by a ring 24, screwed onto the end of the jack 20. The position of the stop is regulated by rotating and thereby axially moving the ring 24.

The force applied to the cam through follower 17 is translated into a force C1 which tends, because of the slope of the profile 19 of the cam 10, to urge the cam toward the finger 15. When the piston 22 is not at the end of its run, the spring 23 applies to the disk 14, by means of the rack 21, an opposing force C2 to the disk 14.

The magnitude of the motive force is a function of the algebraic sum of C1 increased by friction (in the case wherein the piston 22 is stopped), or respectively, of the sum of C1 increased by the value of friction and of the force C2 (when the piston is not at the stop). Because of this, the motive force is capable of moving the cam over its entire range of movement.

Figure 2:
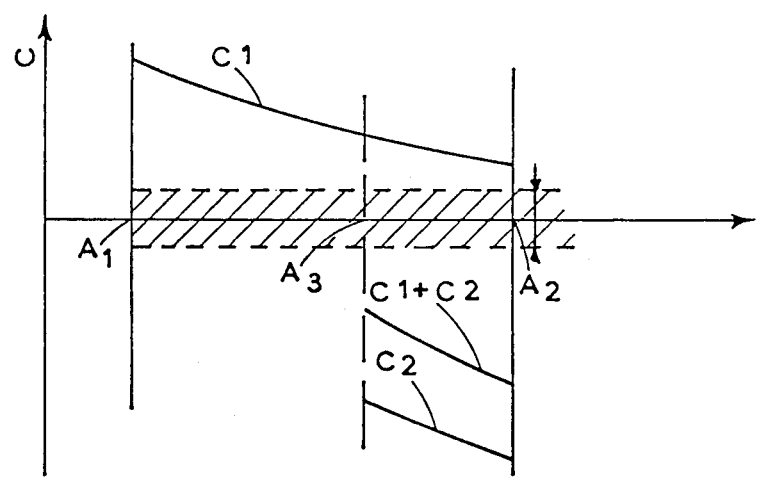
FIG. 2 is a diagram illustrating the functioning of the device of FIG. 1.

FIG. 2 is a diagram illustrating the action of the forces C1 and C2 in the case of a failure of the motor 12, which no longer drives the shaft 11. Values of the angle A formed by the flank 13 with its position of origin, corresponding to the maximum distance of said flank and the finger 15, maintained in the stop position, are plotted on the abcissa, with the force C1 considered positive by convention. The shaded zone represents the range of the friction force in one and the other direction of rotation. The symbol A1 signifies the minimum value of the angle A (also designated zero within the convention of origin adopted), A2 the maximum value of said angle and A3 the value whereof the flank 13 contacts the finger 15 and repulses it when the motor 12 is functioning. The thrust of the spring 18 is designed so that the force C1 is greater than the friction forces. The thrust of the spring 23 is set so that, in absolute value, the algebraic sum C1+C2 remain higher than the friction forces also.

In the event of a motor failure, two cases must be considered. If the value of the angle A at the instant of the failure is between A1 and A3, the action of the follower 17 (the couple C1) urges the cam 10 toward the finger 15, which the cam cannot repulse, because of the opposition of the force C2. If, on the other hand, the value of the angle A is between A2 and A3, the piston 22 acts by means of the rack 21 on the disk 16; the finger 15 then urges the cam 10 until the ring 24 arrests the piston 22. Whatever the position of the cam 10 might be at the instant of the failure, the device of FIG. 1 thus acts on said cam to return it to the stop position imposed by the regulation of the ring 24.

It should be noted that if there is apprehension that the value of the force C1 would not be sufficient by itself to urge the cam 10 toward the finger 15, for example if the operating condition of the device impose an excessively high friction, it is sufficient to apply to the cam a force C3 in opposition to the force C2, by means of a jack (not shown) which is similar to the jack 20. The sole condition to be observed is that the algebraic sum of the forces C1+C2+C3 remain greater than the friction to be overcome.

Figure 3:
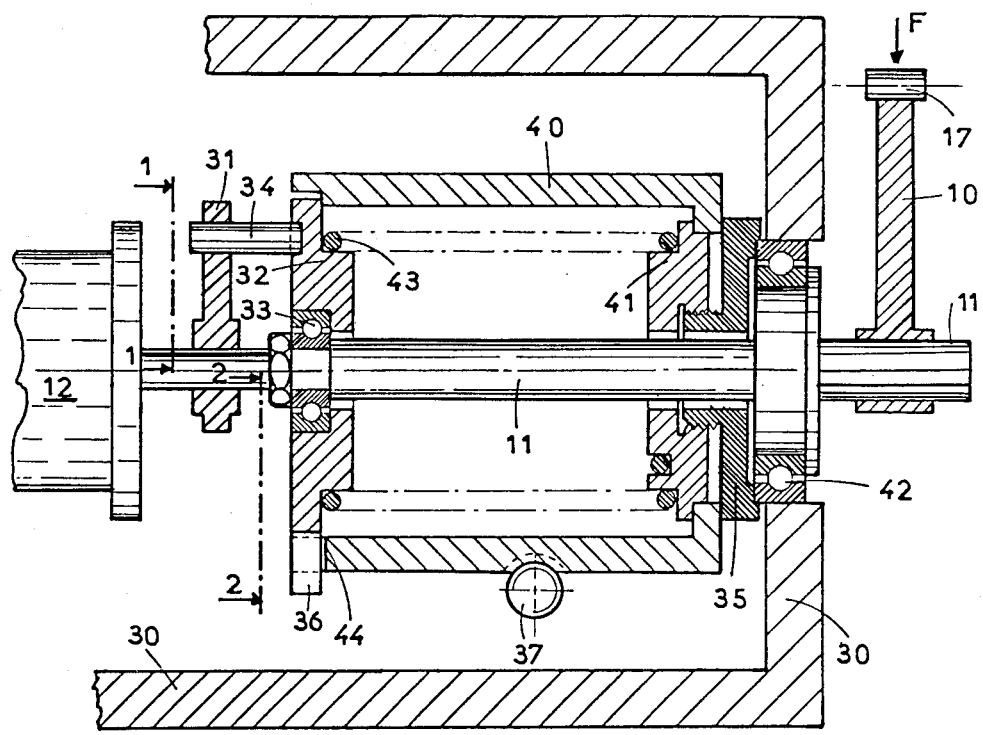
FIG. 3 is a section, along an axial plane, of a second device embodying the invention and with a rotating cam.
Figure 4:
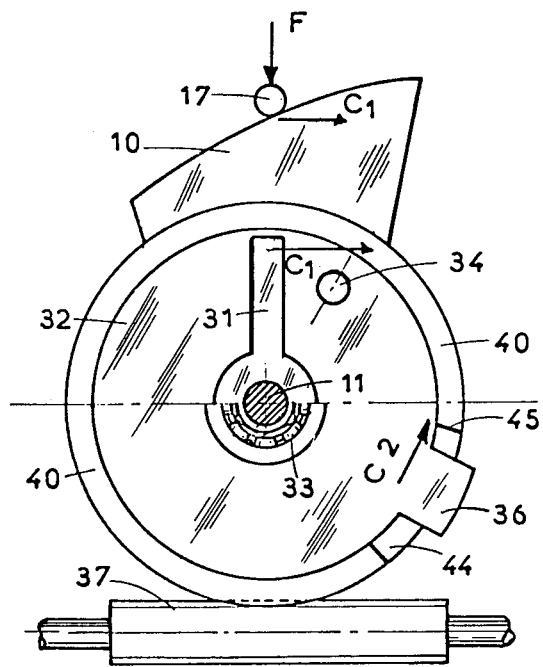
FIG. 4 is a sectional view of the device of FIG. 3, taken on the lines 1—1 and 2—2 of FIG. 3.

FIG. 3 and 4 will now be considered; they represent another embodiment of the device of the invention, equipped with a rotating cam. The example described is suitable, because of its small size, for the control of a regulator and specifically a regulator of a metering device for fuel for the combustion chamber of a turbojet engine.

The motor 12 for the cam is supported by a frame 30, shown in FIG. 3, but not in FIG. 4. The cam 10 is supported by the shaft 11, connected with the motor 12. The supporting spring for the follower 17 connected with the mechanism to be controlled, is not shown. The force of application F of the follower generates, as in the preceding example, a reset force C1 which is supplied to the cam, but the cam, contrary to the preceding example, is not in direct contact with the stop mechanism. The contact function has been entrusted to an index 31, which is fixed on the shaft 11.

The stop mechanism consists of a circular plate 32 mounted in a freely pivoting manner on the shaft 11 by means of the bearing 33 and carrying a finger 34, urged by the index 31. The resetting means for the plate 32 comprise:

a sleeve 40 mounted in the frame 30 and which is closed at one of its ends by the plate 32 inserted in the sleeve under conditions of slight friction so as to permit the relative rotation of the sleeve and the plate;

a plate 41 closing the other end of the sleeve 40, wherein it is inserted by force;

a bearing 42 providing support from from frame 30 for the plate 41 and for the shaft 11;

a helical torsion spring 43 engaging the plate 41 and plate 32 in order to apply to the plate 32 a torque C2, which urges the finger 34 toward the index 31.

The position of the stop is defined by a notch 44 machined into the end of the sleeve 40 surrounding the plate 32. An index 36 integral with the plate 32 extends into the notch 44 and abuts against the edge 45 of the latter under the action of the torque C2, until the index 31, controlled during normal operation by the shaft 11 and the motor 12, repulses the finger 34.

Finally, the regulation of the position of the stop is effective by means of the manually controlled irreversible of the sleeve 40 in the frame 30. The sleeve 40 is maintained in an overhung position by the plate 41, which is secured to a piece 35, which itself is supported by the frame 30 while remaining free to rotate with respect to said frame. The means of rotation may consist for example of an endless screw 37 mounted on the frame 30 and engaging teeth machined in a section of the periphery of the sleeve 40.

The indications shown in FIG. 2 relative to the functioning the device of FIG. 1 are also valid for the device of FIG. 3 and 4, also. They will not be repeated here.

What is claimed is:

1. A device for the control by cam of a mobile mechanism including a motor for effecting the displacement of the cam, a cam follower for the mechanism to be controlled and means to urge said follower against the operating profile of the cam, and further comprising a mobile stop mechanism in the path of movement of said cam, said follower urging the cam toward the stop mechanism, means to urge the stop mechanism toward the cam and means to arrest the stop mechanism in its movement of approach toward the cam to establish a stop position, said means urging said cam follower and said means for urging said stop mechanism being selected so that the cam is able, when actuated by its motor, to move the stop mechanism in order to move it from its stop position, while the stop mechanism is able, when the cam is not being actuated by its motor, to move said cam until the stop position is attained.

2. A control device according to claim 1, which further comprises means to reset the position of the means to arrest the stop mechanism, in order to adjust the stop position.

3. A control device according to claim 1 wherein the slope of the operating profile of the cam is such that the force exercised by the follower on said cam tends to displace the cam toward the stop mechanism profile.

4. A device according to claim 1 wherein said cam is a rotatable cam fixed on a driving shaft, the stop mechanism being a member mounted on the shaft and free to rotate with respect to said shaft, said member also carrying a button abuting against a piece fastened to the shaft.

5. A device according to claim 4 wherein the stop mechanism consists of a crank, with the piece fastened to the shaft being positioned for abuting against the crank pin of said crank.

6. A device according to claim 5, which further comprises means to reset the position of the means to arrest the stop mechanism, in order to adjust the stop position.

7. A device according to claim 6 wherein the means to reset the position of the stop consist of an index carried by said crank and a sleeve having a notch therein for receiving said index with lost motion therebetween.

8. A device according to claim 4 wherein a sleeve is equipped with two terminal side plates mounted on the shaft with freedom of rotation with respect to said shaft, one of the side plates positioned at one end of the ends of the sleeve carrying said button and being itself rotatable with respect to the sleeve to constitute a means for resetting the stop mechanism, with means between the free side plate and the sleeve comprising means to limit the amplitude of the relative rotation of said plate and the sleeve, the latter constituting the means for arresting the stop mechanism and being maintained in a fixed position by a toothed element cooperating with teeth machined into the periphery of said sleeve, to constitute the means for regulating the position of the stop.

9. A control device as defined in claim 1 for controlling the flow of fuel to a jet engine combustion chamber.

10. A control device as defined in claim 8 for controlling the flow of fuel to a jet engine combustion chamber.

* * * * *